United States Patent
Wendel et al.

(10) Patent No.: US 11,932,395 B2
(45) Date of Patent: Mar. 19, 2024

(54) METHOD AND SYSTEM FOR ROBUST POSITIONING USING RANGING SIGNALS

(71) Applicant: Airbus Defence and Space GmbH, Taufkirchen (DE)

(72) Inventors: Jan Wendel, Taufkirchen (DE); Patric Nolle, Taufkirchen (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 75 days.

(21) Appl. No.: 17/605,634

(22) PCT Filed: Apr. 29, 2020

(86) PCT No.: PCT/EP2020/061881
§ 371 (c)(1),
(2) Date: Oct. 22, 2021

(87) PCT Pub. No.: WO2020/233956
PCT Pub. Date: Nov. 26, 2020

(65) Prior Publication Data
US 2022/0204161 A1    Jun. 30, 2022

(30) Foreign Application Priority Data

May 17, 2019   (EP) .................................... 19175049

(51) Int. Cl.
*B64C 39/02* (2023.01)
*G05D 1/00* (2006.01)
*B64U 101/20* (2023.01)

(52) U.S. Cl.
CPC ......... *B64C 39/024* (2013.01); *G05D 1/0022* (2013.01); *G05D 1/101* (2013.01); *B64U 2101/20* (2023.01)

(58) Field of Classification Search
None
See application file for complete search history.

(56) References Cited

U.S. PATENT DOCUMENTS

| | | | |
|---|---|---|---|
| 2015/0353206 A1* | 12/2015 | Wang | B64F 1/222 244/114 R |
| 2016/0259032 A1* | 9/2016 | Hehn | G01S 5/0289 |

(Continued)

FOREIGN PATENT DOCUMENTS

CN    108931806    12/2018

OTHER PUBLICATIONS

International Search Report and Written Opinion for PCT/EP2020/061881, European Patent Office, dated Jul. 10, 2020.

(Continued)

*Primary Examiner* — Hongye Liang
(74) *Attorney, Agent, or Firm* — Williams Mullen; Thomas F. Bergert

(57) ABSTRACT

A method for position calculation of an antenna is provided. The method comprises calculating ranges between the antenna and the at least three transponders. The calculation includes range measurements between an antenna and at least three transponders. Respective positions of the at least three transponders are known. The method further comprises providing a first coordinate of three coordinates. The three coordinates indicate a position of the antenna. The method further comprises calculating second and third coordinates of the three coordinates based on the calculated ranges between the antenna and the at least three transponders. The method further comprises predicting ranges between the antenna and the at least three transponders based on the provided first coordinate and the calculated two coordinates. The method further comprises performing an optimization process based on the calculated ranges and the predicted ranges to infer an optimized position of the antenna. Further, a system for position calculation and an air vehicle comprising the system are provided.

15 Claims, 5 Drawing Sheets

(56) References Cited

U.S. PATENT DOCUMENTS

Figure 1:
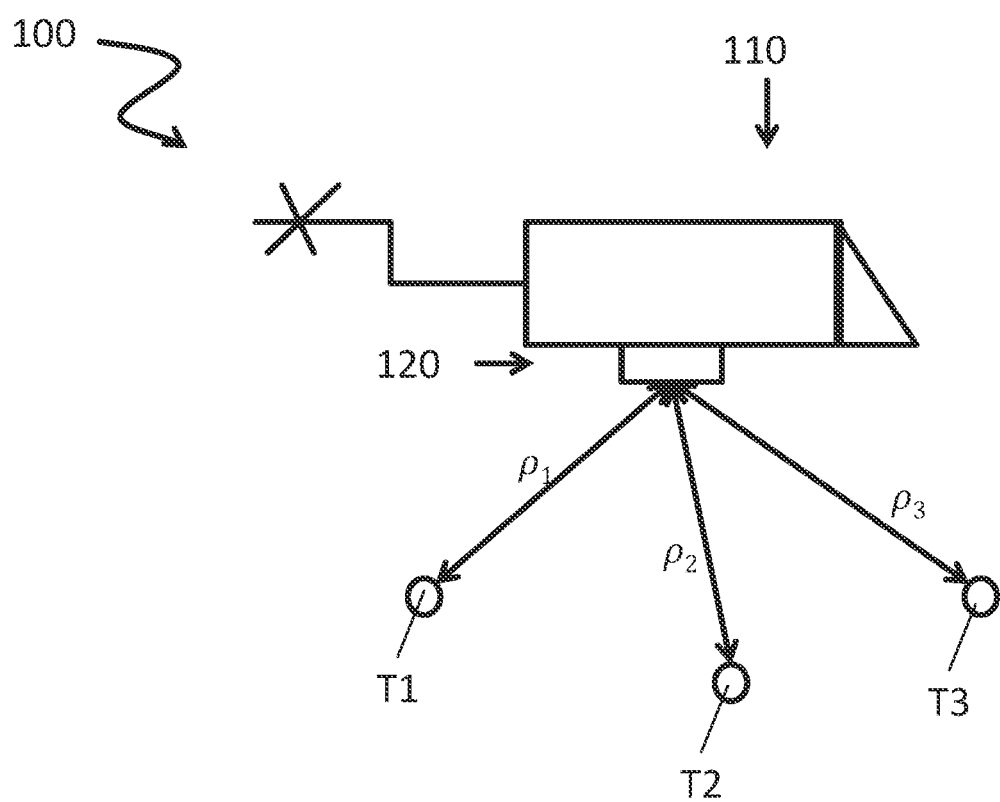

2016/0353238 A1 12/2016 Gherardi et al.
2016/0363659 A1 12/2016 Mindell et al.
2018/0173246 A1 6/2018 Crockett et al.

OTHER PUBLICATIONS

Extended European Search Report, European Patent Application EP 19175049.6, European Patent Office, dated Nov. 21, 2019.
European Patent Office, Examination Report on International Patent Application No. EP 19 175 049.6, dated Jan. 4, 2024.

\* cited by examiner

METHOD AND SYSTEM FOR ROBUST POSITIONING USING RANGING SIGNALS

This application is the U.S. national phase of international application PCT/EP2020/061881, filed on Apr. 29, 2020, which claims the benefit of European application EP 19175049.6 filed on May 17, 2019; all of which are hereby incorporated herein in their entirety by reference.

Examples relate to concepts for position calculation of an antenna and applications thereof and in particular to a method for position calculation of an antenna, a computer program product, a computer readable data carrier, a system for position calculation of an antenna and an air vehicle.

Approach and landing are the most critical phases of a flight. This applies for manned aircrafts, helicopters and unmanned aerial vehicles (UAV) landing on a runway. However, for vertical take-off and landing (VTOL) aircrafts landing on a moving platform like a vessel, the landing procedure is even more challenging.

Consequently, assistance systems may be needed, which either support the landing, or perform the landing completely autonomously. Besides a carefully designed autopilot, this requires the availability of accurate and reliable navigation information. The use of Global Navigation Satellite System (GNSS) receivers is not always an option, e.g. when scenarios are considered where jamming and interference are likely; due to the low power levels of the GNSS signals, a susceptibility to jamming always remains.

A potential solution is the installation of transponders on board of the vessel. The approaching VTOL aircraft interrogates these transponders and measures the time delay until an answer is received. This time delay—potentially corrected for a fixed delay deliberately introduced by the transponder—corresponds to twice the time of flight of the signal between the antenna of the VTOL aircraft and the respective transponder. The multiplication of the time of flight with the speed of light then yields the range between the VTOL aircraft antenna and the respective transponder.

Methods and systems may have to be optimized with respect to robustness. Nevertheless, it is desired to form systems with reliable position calculations.

There may be a demand to provide concepts for enhancing robustness in position calculation.

Such a demand may be satisfied by the subject-matter of the claims.

According to a first aspect, a method for position calculation of an antenna is provided. The method comprises calculating ranges between the antenna and the at least three transponders. The calculation includes range measurements between an antenna and at least three transponders. The at least three transponders may be separated to each other. Further, each of the at least three transponders may be separated from the antenna when performing the calculation, Respective positions of the at least three transponders are known. This knowledge may be a priori. Further, this knowledge may be gathered by a further communication channel over air. The method further comprises providing a first coordinate of three coordinates. The three coordinates indicate a position of the antenna. The method further comprises calculating second and third coordinates of the three coordinates based on the calculated ranges between the antenna and the at least three transponders. The method further comprises predicting ranges between the antenna and the at least three transponders based on the provided first coordinate and the calculated two coordinates. The method further comprises performing an optimization process based on the calculated ranges and the predicted ranges to infer an optimized position of the antenna.

Accordingly, a more robust position may be calculated. The antenna may be part of a moving vehicle. The moving vehicle may be an air vehicle, such as an aircraft, an unmanned vehicle or a helicopter. In particular the method may be for landing the moving vehicle on another moving vehicle. The other moving vehicle may be a vessel, the helicopter should be landing or landed on. The other moving vehicle may comprise the at least three transponders. The at least three transponders may be arranged on the other moving vehicle such that they have static distances to each other while the steps of the method are performed.

The first coordinate may be a single one coordinate of the three coordinates of the antenna position. The origin of the cartesian coordinate system in which the antenna position is mechanized may be in a plane of the at least three transponders. Further, the origin may also be one of the at least three transponders.

The second and third coordinates may respectively differ from the first coordinate, such that only the first coordinate is provided. The term "provided" may mean that in a first step of the optimization method, the first coordinate may be assumed or already known. The a priori knowledge may be due to a priori data or a simple guess.

The antenna may be a single antenna arranged on the moving vehicle, which allows calculating the position of the antenna, Thus, when equipping the moving vehicle with multiples of these antennas, additionally the attitude of the moving vehicle can be calculated. Consequently, the moving vehicle can be steered such that it can land on the other moving vehicle based on this information.

The transponders may be passive or active transceivers to retransmit or reflect corresponding electromagnetic waves to the antenna in order to perform range measurements.

The term "range" may also be understood as the term "distance". Thus, the range measurement may also be called distance measurement.

The optimization process may be a minimization problem solving algorithm.

The optimized position may be the result of the optimization process. The optimized position may be the same or different from the position associated with the provided first coordinate and the calculated second and third coordinates.

The first coordinate of the antenna may be assumed for predicting the respective ranges between the antenna and the at least three transponders.

A good assumption may lead to a fast solving of the optimization process.

The first coordinate of the antenna may be known before predicting the respective ranges between the antenna and the at least three transponders.

The transponders may be mounted on the moving vehicle, like a vessel. The transponders may have a fixed position with respect to each other. The first antenna coordinate may be a z-coordinate for a vertical direction in a respective coordinate system. The second and third antenna coordinates may be x and y coordinates for a horizontal direction in the respective coordinate system.

The second and third antenna coordinates may be calculated using a linear least squares method, when the first coordinate is provided and the respective positions of the at least three transponders are known.

The step of performing the optimization process may comprise subtracting the predicted ranges from the calculated ranges. The result of this subtraction may be squared. Further, this result may be summed. The squared result and/or the summed squared result may yield to a figure of merit. The figure of merit may be associated with the provided first antenna coordinate.

During the optimization process, at least one other first antenna coordinate may be provided. The ranges between the antenna and the at least three transponders may be predicted based on each of the at least one other first antenna coordinate and the calculated two antenna coordinates. The optimization process may be performed based on the calculated ranges and the predicted ranges to infer the optimized position of the antenna based on the figure of merit to be minimized.

The second and third antenna coordinates may be calculated under use of a linear least squares' method.

According to a second aspect, a computer program product is provided. The computer program comprises instructions which, when the program is executed by a computer, cause the computer to carry out the method of the first aspect.

According to a third aspect, a computer-readable data carrier is included. The computer-readable data carrier stores the computer program product of the second aspect.

According to a fourth aspect, a system for position calculation of an antenna is provided. The system comprises an antenna and a processing unit. The antenna is adapted to transmit and receive electromagnetic waves. The processing unit is adapted to calculate, by range measurements between the antenna and at least three transponders, ranges between the antenna and the at least three transponders, Respective positions of the at least three transponders are known. The processing unit is further adapted to provide a first coordinate of three coordinates indicating a position of the antenna. The processing unit is further adapted to calculate second and third coordinates of the three coordinates based on the calculated ranges between the antenna and the at least three transponders. The processing unit is further adapted to predict ranges between the antenna and the at least three transponders based on the provided coordinate and the calculated two coordinates. The processing unit is further adapted to perform an optimization process based on the calculated ranges and the predicted ranges to infer an optimized position of the antenna.

The position calculation may be performed in a vertical take-off manoeuvre from a moving platform or a landing manoeuvre onto a moving platform, wherein the moving platform comprises the transponders.

The processing unit may be connected to the antenna.

According to a fifth aspect, an air vehicle, for example a helicopter, an aircraft or an unmanned vehicle, UAV, comprising the system of the fourth aspect is provided. The system may be mounted on the air vehicle. Further, the system may also be just partly connected or mounted to the air vehicle. The transponders may also be considered as part of the system. However, these transponders may be separated entities in communication with each other and not directly connected but separated from the air vehicle.

It is clear to a person skilled in the art that the statements set forth herein under use of hardware circuits, software means, or a combination thereof may be implemented. The software means can be related to programmed microprocessors or a general computer, an ASIC (Application Specific Integrated Circuit) and/or DSPs (Digital Signal Processors). For example, the processing unit, the system and the method may be implemented partially as a computer, a logical circuit, an FPGA (Field Programmable Gate Array), a processor (for example, a microprocessor, microcontroller (µC) or an array processor)/a core/a CPU (Central Processing Unit), an FPU (Floating Point Unit), NPU (Numeric Processing Unit), an ALU (Arithmetic Logical Unit), a Coprocessor (further microprocessor for supporting a main processor (CPU)), a GPGPU (General Purpose Computation on Graphics Processing Unit), a multi-core processor (for parallel computing, such as simultaneously performing arithmetic operations on multiple main processor(s) and/or graphical processor(s)) or a DSP. It is further clear to the person skilled in the art that even if the herein-described details will be described in terms of a method, these details may also be implemented or realized in a suitable device, a computer processor or a memory connected to a processor, wherein the memory can be provided with one or more programs that perform the method, when executed by the processor. Therefore, methods like swapping and paging can be deployed.

Even if some of the aspects described above have been described in reference to the method, these aspects may also apply to the system. Likewise, the aspects described above in relation to the system may be applicable in a corresponding manner to the method.

It is also to be understood that the terms used herein are for purpose of describing individual embodiments and are not intended to be limiting. Unless otherwise defined, all technical and scientific terms used herein have the meaning which corresponds to the general understanding of the skilled person in the relevant technical field of the present disclosure; they are to be understood too neither too far nor too narrow. If technical terms are used incorrectly in the present disclosure, and thus do not reflect the technical concept of the present disclosure, these should be replaced by technical terms which convey a correct understanding to the skilled person in the relevant technical field of the present disclosure. The general terms used herein are to be construed based on the definition in the lexicon or the context. A too narrow interpretation should be avoided.

It is to be understood that terms such as e.g. "comprising" "including" or "having" etc. mean the presence of the described features, numbers, operations, acts, components, parts, or combinations thereof, and do not exclude the presence or possible addition of one or more further features, numbers, operations, acts, components, parts or their combinations.

Although terms like "first" or "second" etc. may be used to describe different components or features, these components or features are not to be limited to these terms. With the above terms, only one component is to be distinguished from the other. For example, a first component may be referred to as a second component without departing from the scope of the present disclosure; and a second component may also be referred to as a first component. The term "and/or" includes both combinations of the plurality of related features, as well as any feature of that plurality of the described plurality of features.

In the present case, if a component is "connected to", "in communication with" or "accesses" another component, this may mean that it is directly connected to or directly accesses the other component; however, it should be noted that another component may be therebetween. If, on the other hand, a component is "directly connected" to another component or "directly accesses" the other component, it is to be understood that no further components are present therebetween.

In the following, the preferred embodiments of the present disclosure will be described with reference to the accompanying drawings; the same or similar components are always provided with the same or similar reference symbols.

In the description of the present disclosure, detailed explanations of known connected functions or constructions are omitted, insofar as they are unnecessarily distracting from the present disclosure. The accompanying drawings are illustrative of the present disclosure and are not to be construed as a limitation.

Other objects, features, advantages and applications will become apparent from the following description of non-limiting embodiments regarding the accompanying drawings. In the drawings, all described and/or illustrated features, alone or in any combination form the subject matter disclosed therein, irrespective of their grouping in the claims or their relations/references. The dimensions and proportions of components or parts shown in the figures are not necessarily to scale; these dimensions and proportions may differ from illustrations in the figures and implemented embodiments.

Figure 2:
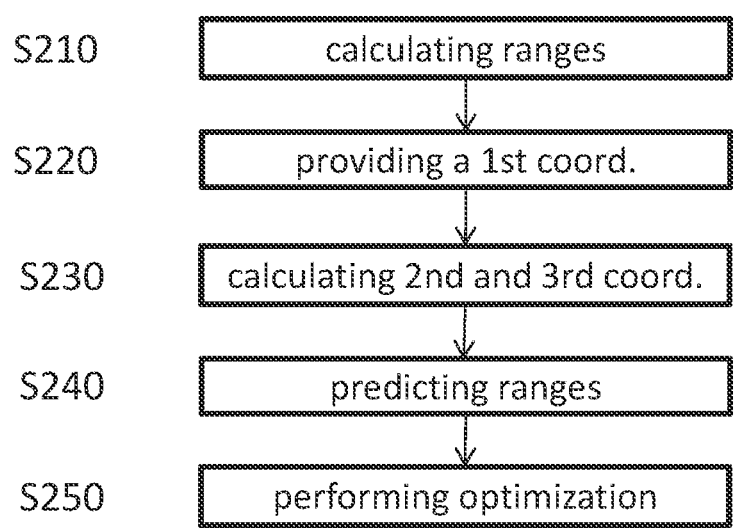
Figure 3:
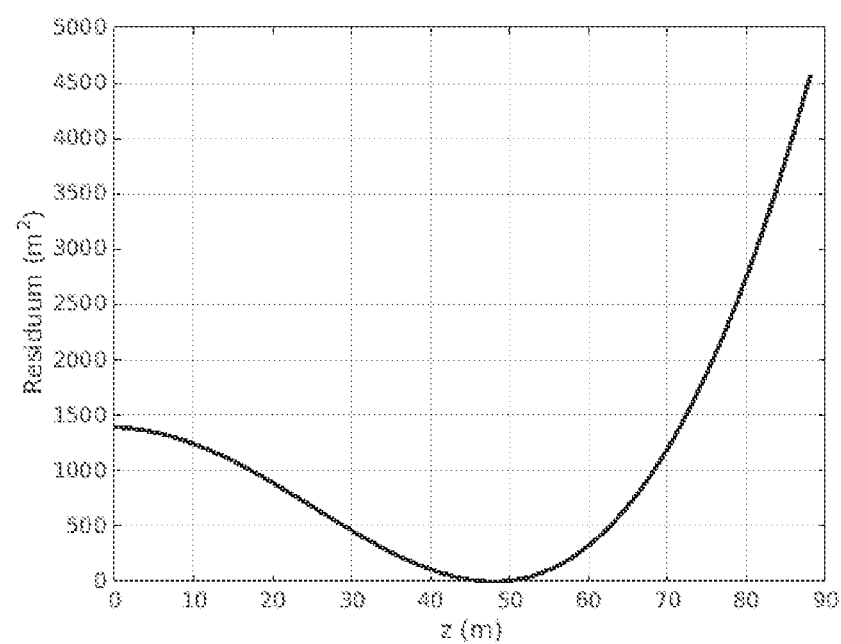
Figure 4:
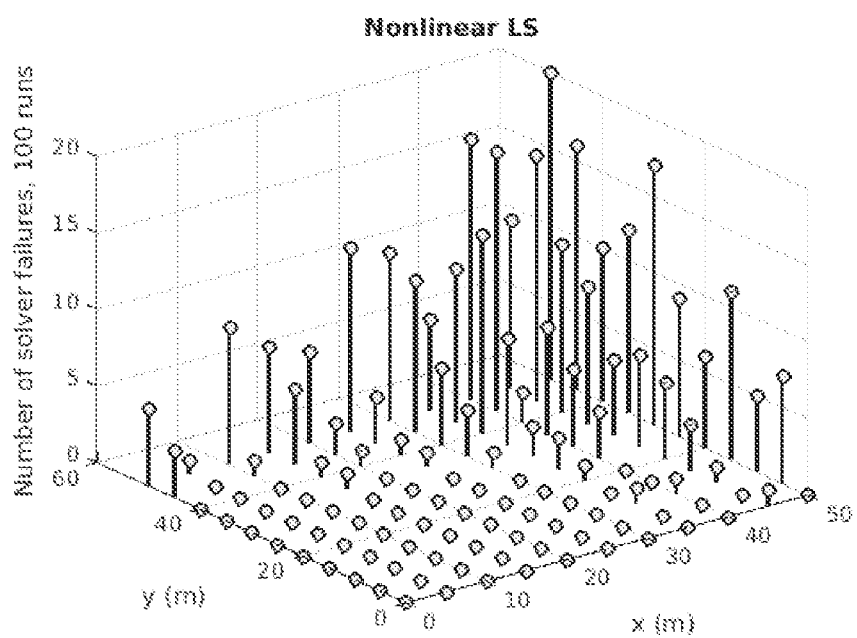
Figure 5:
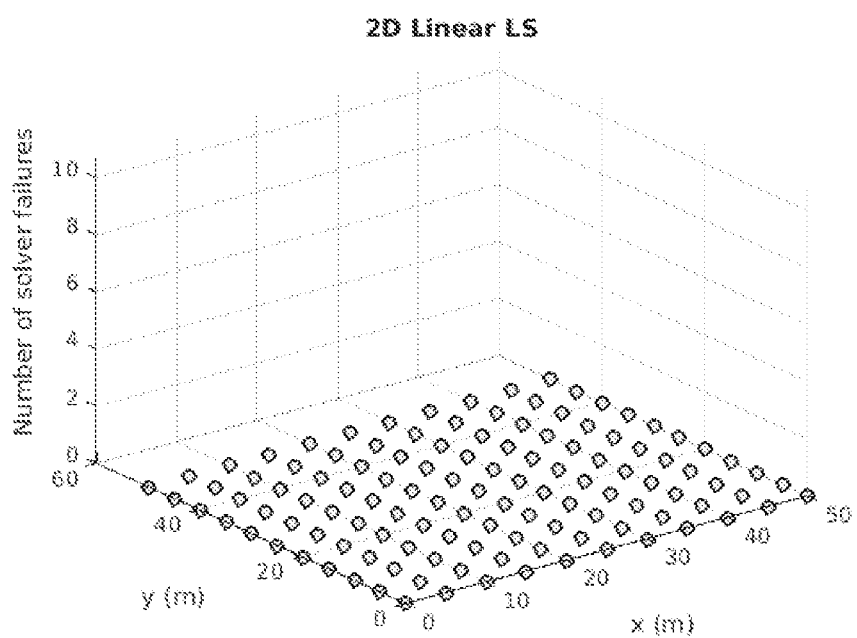

FIG. 1 schematically illustrates a system for position calculation of an antenna and an air vehicle mounting at least part of the system;

FIG. 2 schematically illustrates a method for position calculation of an antenna;

FIG. 3 schematically illustrates a figure of merit versus altitude, true height is 50 m;

FIG. 4 schematically illustrates a number of solver failures out of 100 position calculation attempts as a function of the VTOL aircraft antenna position according to nonlinear least squares method; and FIG. 5 schematically illustrates a number of solver failures out of 100 position calculation attempts as a function of the VTOL aircraft antenna position according to the method disclosed herein.

The system, the method and the air vehicle will now be described with respect to the embodiments.

In the following, without being restricted thereto, specific details are set forth to provide a thorough understanding of the present disclosure. However, it is dear to the skilled person that the present disclosure may be used in other embodiments, which may differ from the details set out below.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 elements.

FIG. 1 schematically illustrates a system (100) for position calculation of an antenna (120) and an air vehicle (110) mounting at least part of the system (100).

The system (100) comprises an antenna (120) and a processing unit (not explicitly shown but may be part of the box as shown as the antenna (120)). The antenna (120) is adapted to transmit and receive electromagnetic waves. The processing unit is adapted to calculate, by range measurements between the antenna (120) and at least three transponders (T1, T2, T3), ranges between the antenna (120) and the at least three transponders (T1, T2, T3). Respective positions of the at least three transponders (T1, T2, T3) are known. The processing unit is further adapted to provide a first coordinate of three coordinates indicating a position of the antenna (120). The processing unit is further adapted to calculate second and third coordinates of the three coordinates based on the calculated ranges between the antenna (120) and the at least three transponders (T1, T2, T3). The processing unit is further adapted to predict ranges between the antenna (120) and the at least three transponders (T1, T2, T3) based on the provided coordinate and the calculated two coordinates. The processing unit is further adapted to perform an optimization process based on the calculated ranges and the predicted ranges to infer an optimized position of the antenna (120).

The position calculation may be performed in a vertical take-off manoeuvre from a moving platform or a landing manoeuvre onto a moving platform, wherein the moving platform comprises the transponders (T1, T2, T3), Further, the processing unit may be connected to the antenna (120).

The air vehicle (110) is for example a helicopter, an aircraft or an unmanned vehicle, UAV, comprising the system (100), The system (100) may be mounted on the air vehicle (110), Further, the system (100) may also be just partly connected or mounted to the air vehicle (110). The transponders (T1, T2, T3) may also be considered as part of the system. However, these transponders (T1, T2, T3) may be separated entities in communication with each other and not directly connected but separated from the air vehicle (110).

More details and aspects are mentioned in connection with the embodiments described above or below. The embodiment shown in FIG. 1 may comprise one or more optional additional features corresponding to one or more aspects mentioned in connection with the proposed concept or one or more embodiments described below (e.g. FIGS. 2-5).

FIG. 2 schematically illustrates a method for position calculation of an antenna. The method comprises calculating (S210) ranges between the antenna and the at least three transponders. The calculation includes range measurements between an antenna and at least three transponders. The at least three transponders may be separated to each other. Further, each of the at least three transponders may be separated to the antenna when performing the calculation, Respective positions of the at least three transponders are known. This knowledge may be a priori. Further, this knowledge may be gathered by a further communication channel over air. The method further comprises providing (S220) a first coordinate of three coordinates. The three coordinates indicate a position of the antenna. The method further comprises calculating (S230) second and third coordinates of the three coordinates of the antenna based on the calculated ranges between the antenna and the at least three transponders. The method further comprises predicting (S240) ranges between the antenna and the at least three transponders based on the provided first coordinate and the calculated two coordinates. The method further comprises performing (S250) an optimization process based on the calculated ranges and the predicted ranges to infer an optimized position of the antenna.

Accordingly, a more robust position may be calculated. The antenna may be part of a moving vehicle. The moving vehicle may be an air vehicle, such as an aircraft, an unmanned vehicle or a helicopter. In particular, the method may be for landing the moving vehicle on another moving vehicle. The other moving vehicle may be a vessel, the helicopter should be landing or landed on. The other moving vehicle may comprise the at least three transponders. The at least three transponders may be arranged on the other moving vehicle such that they have static distances to each other while the steps of the method are performed.

The first coordinate may be a single one coordinate of the three coordinates of the antenna position. The origin of the cartesian coordinate system in which the antenna position is mechanized may be in a plane of the at least three transponders. Further, the origin may also be one of the at least three transponders.

The second and third coordinates may respectively differ from the first coordinate, such that only the first coordinate is provided. The term "provided" may mean that in a first step of the optimization method, the first coordinate may be assumed or already known. The a priori knowledge may be due to a priori data or a simple guess.

The antenna may be a single antenna arranged on the moving vehicle, which allows calculating the position of the antenna. Thus, when equipping the moving with multiples of these antennas, additionally the attitude of the moving vehicle can be calculated. Consequently, the moving vehicle can be steered such that it can land on the other moving vehicle based on this information.

The transponders may be passive or active transceivers to retransmit or reflect corresponding electromagnetic waves to the antenna in order to perform range measurements.

The term "range" may also be understood as the term "distance". Thus, the range measurement may also be called distance measurement.

The optimization process may be a minimization problem solving algorithm.

The optimized position may be the result of the optimization process. The optimized position may be the same or different from the position associated with the provided first coordinate and the calculated second and third coordinates.

The first coordinate may be assumed for predicting the respective ranges between the antenna and the at least three transponders.

A good assumption may lead to a fast solving of the optimization process.

The first coordinate may be known before predicting the respective ranges between the antenna and the at least three transponders.

The transponders may be mounted on the moving vehicle, like a vessel. The transponders may have a fixed position with respect to each other. The first coordinate may be a z-coordinate for a vertical direction in a respective coordinate system. The second and third coordinates may be x and y coordinates for a horizontal direction in the respective coordinate system.

The second and third coordinates may be calculated using a linear least squares method, when the first coordinate is provided and the respective positions of the at least three transponders are known.

The step of performing the optimization process may comprise subtracting the predicted ranges from the calculated ranges. The result of this subtraction may be squared. Further, this result may be summed. The squared result and/or the summed squared result may yield to a figure of merit. The figure of merit may be associated with the provided first coordinate.

During the optimization process, at least one other first coordinate may be provided. The ranges between the antenna and the at least three transponders may be predicted based on each of the at least one other first coordinate and the calculated two coordinates. The optimization process may be performed based on the calculated ranges and the predicted ranges to infer the optimized position of the antenna based on the figure of merit to be minimized.

The second and third coordinates may be calculated under use of a linear least squares' method.

More details and aspects are mentioned in connection with the embodiments described above or below. The embodiment shown in FIG. 2 may comprise one or more optional additional features corresponding to one or more aspects mentioned in connection with the proposed concept or one or more embodiments described above (e.g. FIG. 1) or below (e.g. FIGS. 3-5).

In the following (with regards to FIG. 3-5), an exemplary algorithm for calculating a VTOL aircraft antenna position from range measurements to three or more transponders at known positions is derived. The algorithm may be part of the method as described with respect to FIG. 2 and may also be part of the implementation of the system according to FIG. 1 and in particular in the implementation of the processing unit described with respect thereto.

A squared range measurement to the first transponder can be modelled as follows:

$$\rho_1^2 = (x - x_1)^2 + (y - y_1)^2 + (z - z_1)^2.$$

Hereby, the coordinates x,y,z denote the position of the VTOL aircraft antenna, and $x_1, y_1, z_1$ are the position coordinates of the first transponder.

Expanding yields $$\rho_1^2 = x^2 - 2x_1 x + x_1^2 + y^2 - 2y_1 y + y_1^2 + z^2 - 2z_1 z + z_1^2.$$

Introducing a second transponder with index j, one can write $$\rho_2^2 = x^2 - 2x_2 x + x_2^2 + y^2 - 2y_2 y + y_2^2 + z^2 - 2z_2 z + z_2^2.$$

Squaring the relationship $$\rho_1 = \rho_1 - \rho_2 + \rho_2$$

yields $$\rho_1^2 = (\rho_1 - \rho_2)^2 + 2(\rho_1 - \rho_2)\rho_2 + \rho_2^2.$$

Inserting in the squared range equation of the first transponder yields $$\rho_1^2 = (\rho_1 - \rho_2)^2 + 2(\rho_1 - \rho_2)\rho_2 + \rho_2^2 =$$
$$x^2 - 2x_1 x + x_1^2 + y^2 - 2y_1 y + y_1^2 + z^2 - 2z_1 z + z_1^2.$$

Subtracting the squared range equation of he second transponder yields $$\rho_1^2 - \rho_2^2 =$$
$$(\rho_1 - \rho_2)^2 + 2(\rho_1 - \rho_2)\rho_2 + \rho_2^2 - \rho_2^2 = x^2 - 2x_1 x + x_1^2 + y^2 - 2y_1 y + y_1^2 +$$
$$z^2 - 2z_1 z + z_1^2 - x^2 + 2x_2 x - x_2^2 - y^2 + 2y_2 y - y_2^2 - z^2 + 2z_2 z - z_2^2$$
$$(\rho_1 - \rho_2)^2 + 2(\rho_1 - \rho_2)\rho_2 = -2(x_1 - x_2)x + x_1^2 - x_2^2 -$$
$$2(y_1 - y_2)y + y_1^2 - y_2^2 - 2(z_1 - z_2)z + z_1^2 - z_2^2.$$

Moving all known quantities to the left, one gets $$(\rho_1 - \rho_2)^2 + 2(\rho_1 - \rho_2)\rho_2 - (x_1^2 + y_1^2 + z_1^2) + (x_2^2 + y_2^2 + z_2^2) = \\ -2(x_1 - x_2)x - 2(y_1 - y_2)y - 2(z_1 - z_2)z.$$

With $d_1^2 = (x_1^2 + x_1^2 + x_1^2)$ and $d_2^2 = (x_2^2 + x_2^2 + x_2^2)$, this can be expressed as follows:

$$(\rho_1 - \rho_2)^2 + 2(\rho_1 - \rho_2)\rho_2 - d_1^2 + d_2^2 = \\ (-2(x_1 - x_2) \quad -2(y_1 - y_2) \quad -2(z_1 - z_2)) \begin{pmatrix} x \\ y \\ z \end{pmatrix}.$$

The VTOL aircraft antenna position now depends linearly on a non-linear combination of measurements and transponder positions.

An attempt could now be made to solve for the VTOL aircraft antenna position directly, Writing now this equation for all transponder measurements in matrix-vector notation yields $$\begin{pmatrix} (\rho_1 - \rho_2)^2 + 2(\rho_1 - \rho_2)\rho_2 - d_1^2 + d_2^2 \\ (\rho_1 - \rho_3)^2 + 2(\rho_1 - \rho_3)\rho_3 - d_1^2 + d_3^2 \\ (\rho_1 - \rho_4)^2 + 2(\rho_1 - \rho_4)\rho_4 - d_1^2 + d_4^2 \\ \vdots \end{pmatrix} = \\ \begin{pmatrix} -2(x_1 - x_2) & -2(y_1 - y_2) & -2(z_1 - z_2) \\ -2(x_1 - x_3) & -2(y_1 - y_3) & -2(z_1 - z_3) \\ -2(x_1 - x_4) & -2(y_1 - y_4) & -2(z_1 - z_4) \\ \vdots & \vdots & \vdots \end{pmatrix} \begin{pmatrix} x \\ y \\ z \end{pmatrix}.$$

This set of equations is of the form $$y = Hx,$$

the least squares solution for x is given by $$x = (H^T H)^{-1} H^T y,$$

also a weighted least squares could be considered. However, if all transponders lie in the same plane, H does not have full column rank, and consequently the inverse) $(H^T H)^{-1}$ cannot be computed: With all transponders in the same plane, mirroring the true VTOL aircraft antenna position at this plane leads another position, for which the same range measurements would be obtained.

A solution to this problem can be found by assuming the altitude z would be known. In that case the equation derived previously, $$(\rho_1 - \rho_2)^2 + 2(\rho_1 - \rho_2)\rho_2 - d_1^2 + d_2^2 = $$

-continued $$(-2(x_1 - x_2) \quad -2(y_1 - y_2) \quad -2(z_1 - z_2)) \begin{pmatrix} x \\ y \\ z \end{pmatrix},$$

can be rearranged, yielding $$(\rho_1 - \rho_2)^2 + 2(\rho_1 - \rho_2)\rho_2 - d_1^2 + d_2^2 + 2(z_1 - z_2)z = \\ (-2(x_1 - x_2) \quad -2(y_1 - y_2)) \begin{pmatrix} x \\ y \end{pmatrix}.$$

Writing now again all this equation for transponder measurements in matrix vector notation yields $$\begin{pmatrix} (\rho_1 - \rho_2)^2 + 2(\rho_1 - \rho_2)\rho_2 - d_1^2 + d_2^2 + 2(z_1 - z_2)z \\ (\rho_1 - \rho_3)^2 + 2(\rho_1 - \rho_3)\rho_3 - d_1^2 + d_3^2 + 2(z_1 - z_3)z \\ (\rho_1 - \rho_4)^2 + 2(\rho_1 - \rho_4)\rho_4 - d_1^2 + d_4^2 + 2(z_1 - z_4)z \\ \vdots \end{pmatrix} = \\ \begin{pmatrix} -2(x_1 - x_2) & -2(y_1 - y_2) \\ -2(x_1 - x_3) & -2(y_1 - y_3) \\ -2(x_1 - x_4) & -2(y_1 - y_4) \\ \vdots & \vdots \end{pmatrix} \begin{pmatrix} x \\ y \end{pmatrix}.$$

This set of equations can be solved straight using linear least squares or other means, if the altitude z is known. In case the altitude is known, this set of equations is solved for the horizontal VTOL aircraft antenna position coordinates x,y, no further steps are needed.

However, in general the altitude is not known. Therefore, a candidate altitude z is assumed, and a horizontal VTOL aircraft antenna position coordinates x,y is calculated using linear least squares, or any other means. Then, based on the candidate altitude z and the resulting VTOL aircraft antenna position coordinates x,y, the ranges to the transponders are calculated. These predicted ranges are subtracted from the actual range measurements, and the resulting differences are squared and summed. This yields a figure of merit for the candidate altitude z. Now an optimization process is implemented, which searches for the minimum figure of merit as a function of the candidate altitude z. The candidate altitude z and horizontal VTOL aircraft antenna position coordinates x,y that lead to the minimum figure of merit represent the result provided by the method.

An illustrative example for the figure of merit as function of the altitude is shown in FIG. 3.

It has to be noted that the proposed method can be used either to provide epoch per epoch independent position estimates of the VTOL aircraft antenna, or to provide a position estimate for initialization of a Kalman filter or another sensor fusion algorithm, which might then employ additional sensors like accelerometers and gyroscopes.

It has to be noted that the approach described above is not restricted to VTOL aircrafts, vessels and transponders. It applies to any situation where an unknown position is calculated from range measurements, whereby the positions to which the range measurements are made must be known.

A standard approach for solving the problem addressed herein would be to use non-linear least squares, non-linear weighted least squares, Levenberg-Marquardt or related algorithms.

The method described herein may have two main advantages over these standard solutions:
No initial guess for the VTOL aircraft antenna horizontal position required; for the standard solutions, the choice of the initial guess can make the difference between convergence and divergence,
The described method is more robust than the standard approaches.

The increased robustness achieved with the described method is illustrated by the results of Monte-Carlo simulation runs. For these Monte-Carlo runs, four transponders were assumed at following positions: [−2;−2;0], [2;−2;0], [2;2;0], [−2;2;0]. The range measurements to these transponders were corrupted with zero mean Gaussian noise with a standard deviation of 0.1 meters.

For a non-linear least squares approach, the number of solver failures out of 100 position calculation attempts as a function of the VTOL aircraft antenna position is shown in FIG. 4. As an initial guess for the altitude, the mean of the four range measurements was used. The x- and y-coordinates of the initial position guess were zero. Obviously, in close proximity to the transponders, no solver failures occur, i.e. the non-linear least squares always converged. In greater distances from the transponders, several solver failures can be observed, i.e, the probability for divergence increases.

For the same scenario, the results obtained with the method as described above are shown in FIG. 5. No solver failures are observed.

More details and aspects are mentioned in connection with the embodiments described above or below. The embodiment shown in FIGS. 3-5 may comprise one or more optional additional features corresponding to one or more aspects mentioned in connection with the proposed concept or one or more embodiments described above (e.g. FIGS. 1-2) or below.

According to one or more aspect, the problem of calculating the VTOL aircraft antenna position from range measurements to three or more transponders at known positions may be solved.

The calculation of the position of a source on a two-dimensional plane may be performed under use of time difference of arrival measurements (TDOA) at several antennas of a VTOL aircraft. For example, a two-step approach is used: First, the two coordinates of the source are expressed as a function of the unknown time of flight of the signal from the source to one of the antennas. Then, inserting this relationship in the equation that relates time of flight to the distance between antenna and source eliminates the source position from the equation, yielding a quadratic equation for the time of flight, Solving for the time of flight, and inserting in the relationship derived in the first step yields the source position. A drawback of this approach is that it solves a two-dimensional problem only, while for supporting VTOL aircraft landings, a three dimensional position information may be required.

The aspects and features mentioned and described together with one or more of the previously detailed examples and figures, may as well be combined with one or more of the other examples in order to replace a like feature of the other example or in order to additionally introduce the feature to the other example.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

The invention claimed is:

1. A method for position calculation of an antenna, the method comprising:
calculating, by range measurements between an antenna on a first vehicle and at least three transponders on a second vehicle, ranges between the antenna and the at least three transponders, wherein respective positions of the at least three transponders are known;
providing a first antenna coordinate of three antenna coordinates indicating a position of the antenna, wherein the first antenna coordinate is assumed for or known before predicting the ranges between the antenna and the at least three transponders;
calculating second and third antenna coordinates of the three antenna coordinates based on the calculated ranges between the antenna and the at least three transponders;
predicting ranges between the antenna and the at least three transponders based on the assumed or known first antenna coordinate and the calculated two antenna coordinates;
performing an optimization process based on the calculated ranges and the predicted ranges to infer an optimized position of the antenna; and
steering the first vehicle for landing on the second vehicle based on the optimized position of the antenna.

2. The method of claim 1, wherein the transponders are mounted on a moving vehicle.

3. The method of claim 1, wherein the transponders have a fixed position with respect to each other.

4. The method of claim 1, wherein the first antenna coordinate may be a z-coordinate for a vertical direction in a respective coordinate system, and wherein the second and third antenna coordinates are x and y coordinates for horizontal directions in the respective coordinate system.

5. The method of claim 1, wherein the second and third antenna coordinates are calculated using a linear least squares method, when the first antenna coordinate is provided and the respective positions of the at least three transponders are known.

6. The method of claim 1, wherein the step of performing the optimization process comprises subtracting the predicted ranges from the calculated ranges, wherein result of this subtraction is squared and summed yielding to a figure of merit associated with the first antenna coordinate.

7. The method of claim 1, wherein, during the optimization process, at least one other first antenna coordinate is provided, wherein the ranges between the antenna and the at least three transponders are predicted based on each of the at least one other first antenna coordinate and the calculated two antenna coordinates, and wherein the optimization process is performed based on the calculated ranges and the predicted ranges to infer the optimized position of the antenna based on a figure of merit to be minimized.

8. The method of claim 1, wherein the second and third antenna coordinates are calculated under use of a linear least squares' method.

9. The method of claim 1, wherein the first vehicle is moving.

10. The method of claim 1, wherein the second vehicle is moving.

11. The method of claim 1, wherein the first and second vehicles are moving.

12. A non-transitory computer-readable data carrier having stored a computer program product, the computer program product comprising instructions which, when the computer program product is executed by a computer, cause the computer to carry out a method for position calculation of an antenna, the method comprising:
- calculating, by range measurements between an antenna on a first vehicle and at least three transponders on a second vehicle, ranges between the antenna and the at least three transponders, wherein respective positions of the at least three transponders are known;
- providing a first antenna coordinate of three antenna coordinates indicating a position of the antenna, wherein the first antenna coordinate is assumed for or known before predicting the ranges between the antenna and the at least three transponders;
- calculating second and third antenna coordinates of the three antenna coordinates based on the calculated ranges between the antenna and the at least three transponders;
- predicting ranges between the antenna and the at least three transponders based on the assumed or known first antenna coordinate and the calculated two antenna coordinates;
- performing an optimization process based on the calculated ranges and the predicted ranges to infer an optimized position of the antenna; and
- steering the first vehicle for landing on the second vehicle based on the optimized position of the antenna.

13. A system for position calculation of an antenna, the system comprising:
- an antenna on a first vehicle adapted to transmit and receive electromagnetic waves;
- a processor adapted to
- calculate, by range measurements between the antenna and at least three transponders on a second vehicle, ranges between the antenna and the at least three transponders, wherein respective positions of the at least three transponders are known,
- provide a first antenna coordinate of three antenna coordinates indicating a position of the antenna, wherein the first antenna coordinate is assumed for or known before predicting the ranges between the antenna and the at least three transponders,
- calculate second and third antenna coordinates of the three antenna coordinates based on the calculated ranges between the antenna and the at least three transponders;
- predict ranges between the antenna and the at least three transponders based on the assumed or known first antenna coordinate and the calculated two antenna coordinates;
- perform an optimization process based on the calculated ranges and the predicted ranges to infer an optimized position of the antenna; and
- steer the first vehicle for landing on the second vehicle based on the optimized position of the antenna.

14. The system of claim 13, wherein the position calculation is performed in a vertical take-off maneuver from a moving platform or a landing maneuver onto a moving platform, wherein the moving platform comprises the transponders.

15. An air vehicle comprising the system of claim 13.

* * * * *